United States Patent
Hong et al.

(10) Patent No.: US 10,214,690 B2
(45) Date of Patent: Feb. 26, 2019

(54) LIQUID CRYSTAL COMPOSITION AND A LIQUID CRYSTAL DISPLAY INCLUDING THE SAME

(71) Applicant: SAMSUNG DISPLAY CO., LTD., Yongin-si, Gyeonggi-do (KR)

(72) Inventors: Sung-Hwan Hong, Suwon-si (KR); Eun Kyung Koh, Seoul (KR); Myung-Eun Kim, Hwaseong-si (KR); Fusayuki Takeshita, Seoul (KR); Ji Hong Bae, Yongin-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 39 days.

(21) Appl. No.: 15/490,392

(22) Filed: Apr. 18, 2017

(65) Prior Publication Data
US 2017/0298274 A1   Oct. 19, 2017

(30) Foreign Application Priority Data
Apr. 19, 2016   (KR) .................. 10-2016-0047577

(51) Int. Cl.
*G02F 1/1333*   (2006.01)
*C09K 19/32*   (2006.01)
*G02F 1/1343*   (2006.01)

(52) U.S. Cl.
CPC ........ *C09K 19/32* (2013.01); *G02F 1/134309* (2013.01); *G02F 2001/134345* (2013.01); *G02F 2201/121* (2013.01); *G02F 2201/123* (2013.01)

(58) Field of Classification Search
CPC . C09K 19/32; G02F 1/1333; G02F 1/134309; G02F 2001/134345; G02F 2201/121; G02F 2201/123
USPC ...................................... 252/299.62
See application file for complete search history.

(56) References Cited

U.S. PATENT DOCUMENTS

2012/0286200 A1   11/2012   Kobayashi

FOREIGN PATENT DOCUMENTS

| CN | 102875417 | 1/2013 |
|---|---|---|
| CN | 103254909 | 8/2013 |
| KR | 10-2008-0112387 | 12/2008 |
| KR | 10-2010-0041805 | 4/2010 |
| KR | 10-2014-0027550 | 3/2014 |
| KR | 10-2015-0056863 | 5/2015 |
| WO | 2009/030322 | 3/2009 |
| WO | 2013/008822 | 1/2013 |

*Primary Examiner* — Geraldina Visconti
(74) *Attorney, Agent, or Firm* — F. Chau & Associates, LLC

(57) ABSTRACT

A liquid crystal composition including a liquid crystal compound represented by Formula 1:

[Formula 1]

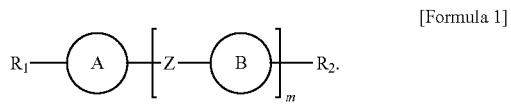

20 Claims, 2 Drawing Sheets

LIQUID CRYSTAL COMPOSITION AND A LIQUID CRYSTAL DISPLAY INCLUDING THE SAME

CROSS-REFERENCE TO RELATED APPLICATION

This application claims priority under 35 U.S.C. § 119 to Korean Patent Application No. 10-2016-0047577 filed in the Korean Intellectual Property Office on Apr. 19, 2016, the disclosure of which is incorporated by reference herein in its entirety.

TECHNICAL FIELD

Exemplary embodiments of the present invention relate to a liquid crystal composition, and more particularly to a liquid crystal display device including the same.

DISCUSSION OF RELATED ART

A liquid crystal display (LCD) is a type of display device. The liquid crystal display may determine a direction of liquid crystal molecules of a liquid crystal layer. The liquid crystal display may control a transmittance of light passing through the liquid crystal layer, for example, by applying a voltage to field generating electrodes. Thus, an electric field in the liquid crystal layer may be generated.

The liquid crystal layer may control the transmittance of light for the liquid crystal display to produce a desired image. Liquid crystal displays may have various characteristics, such as relatively low-voltage driving, a relatively high voltage holding ratio (VHR), a relatively wide viewing angle, a relatively wide operation temperature range, and a relatively high response speed.

A liquid crystal display with a relatively high response speed may be produced by a relative increase in the several properties of the liquid crystal display, such as a rotational viscosity, a refractive index, or an elastic coefficient included in the liquid crystal composition.

SUMMARY

One or more exemplary embodiments of the present invention provide a liquid crystal composition which may reduce a rotational viscosity to produce a relatively high speed response characteristic, and a liquid crystal display including the same.

One or more exemplary embodiments of the present invention provide a liquid crystal composition. The liquid crystal composition includes a liquid crystal compound represented by the following Formula 1.

[Formula 1]

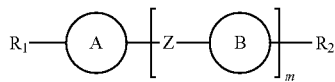

A is selected from

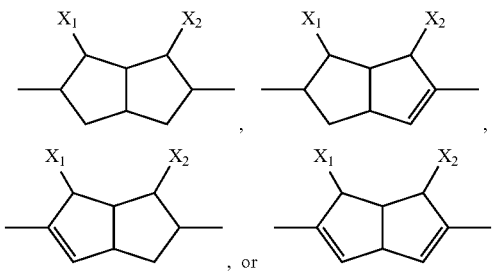

$X_1$ and $X_2$ are each independently selected fluorine, $CF_3$, or $C_nH_{2n+1}$. Z is selected from a single bond, a double bond, $CF_2CF_2$, $OCF_2$, or $CF_2O$. $R_1$ is selected from hydrogen, fluorine, $CF_3$, $C_nH_{2+1}$, or $C_nH_{2n+1}O$. $R_2$ is selected from hydrogen, fluorine, $CF_3$, $C_nH_{2n+1}$, or $OC_nH_{2n+1}$.

B is selected from

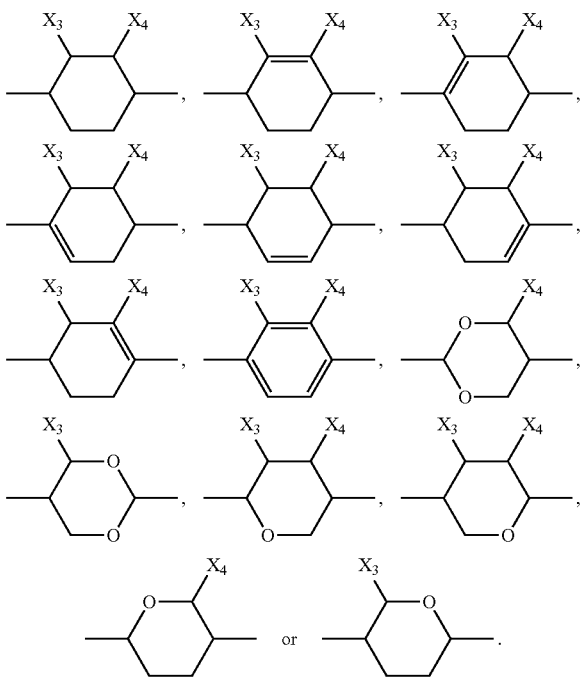

$X_3$ and $X_4$ are each independently selected from hydrogen, fluorine, $CF_3$, or $C_nH_{2n+1}$, m is a natural number selected from 1 or 2, n is a natural number selected from 1 to 5.

The content of the liquid crystal compound represented by Formula 1 may be in an amount ranging from about 1 wt % to about 20 wt % of the liquid crystal composition.

The liquid crystal compound represented by Formula 1 may include a liquid crystal compound represented by the following Formulae 1-1 to 1-5.

[Formula 1-1]
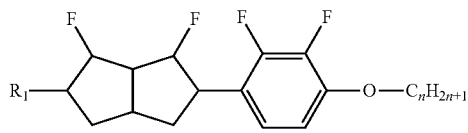

[Formula 1-2]
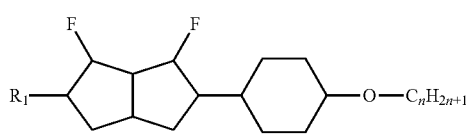

[Formula 1-3]
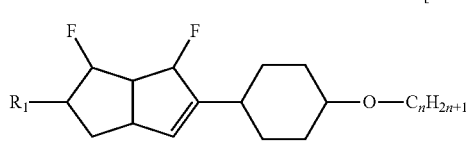

[Formula 1-4]
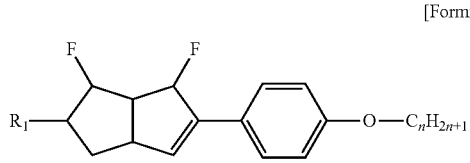

[Formula 1-5]
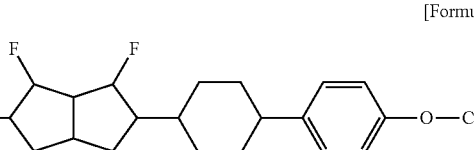

$R_1$ may be selected from hydrogen, fluorine, $CF_3$, $C_nH_{2n+1}$, or $C_nH_{2n+1}O$, n may be a natural number selected from 1 to 5.

The liquid crystal compound represented by Formula 1 may include a liquid crystal compound represented by the following Formulae 1-6 to 1-10.

[Formula 1-6]
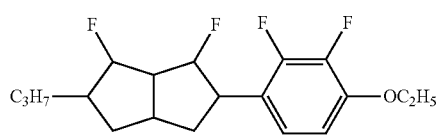

[Formula 1-7]
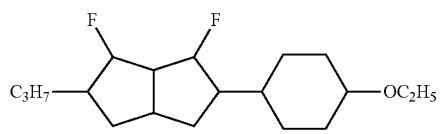

[Formula 1-8]
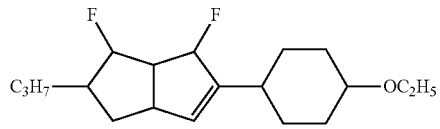

[Formula 1-9]
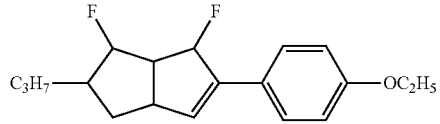

[Formula 1-10]
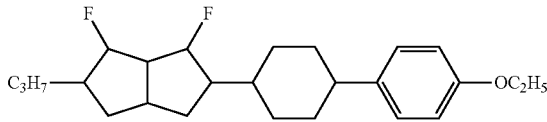

The liquid crystal composition may further include at least one liquid crystal compound selected from liquid crystal compounds represented by the following Formulae 2 to 10.

[Formula 2]
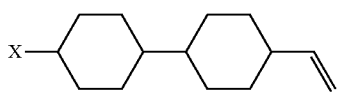

[Formula 3]
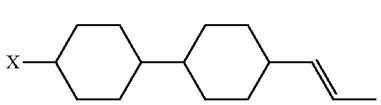

[Formula 4]
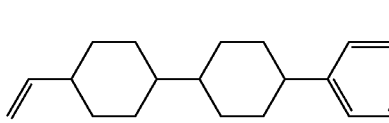

[Formula 5]

[Formula 6]
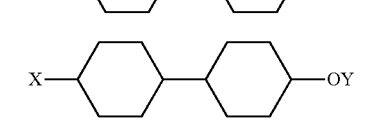

[Formula 7]

[Formula 8]

[Formula 9]
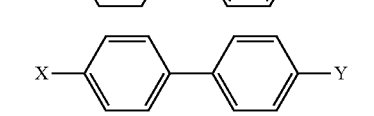

[Formula 10]

X and Y may each independently be $C_nH_{2n+1}$, n may be a natural number selected from 1 to 5.

The liquid crystal composition may further include at least one liquid crystal compound selected from liquid crystal compounds represented by the following Formulae 11 to 20.

[Formula 11]
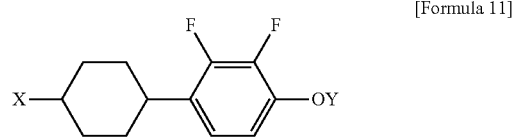

-continued

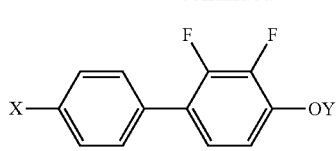
[Formula 12]

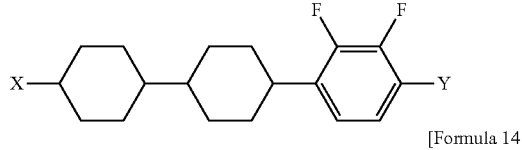
[Formula 13]

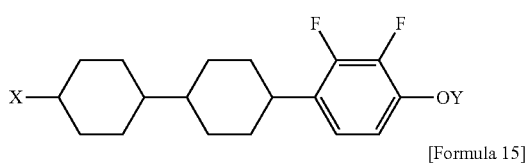
[Formula 14]

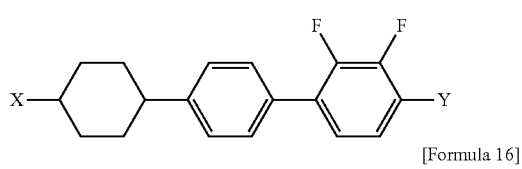
[Formula 15]

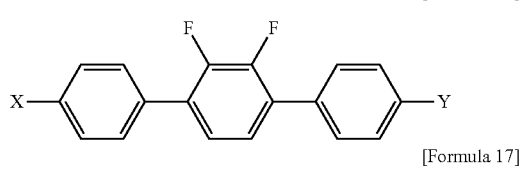
[Formula 16]

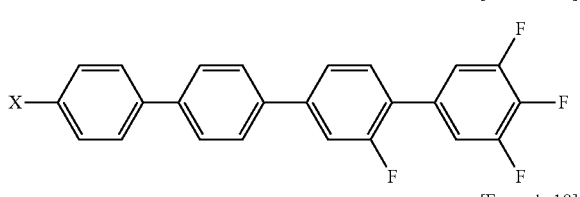
[Formula 17]

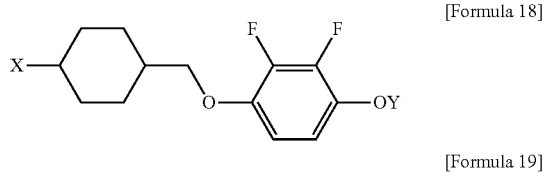
[Formula 18]

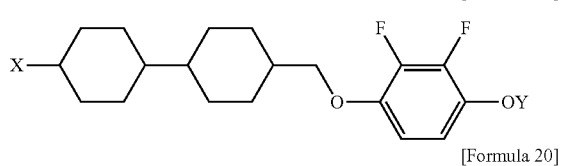
[Formula 19]

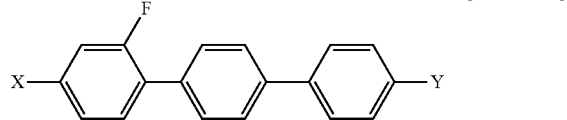
[Formula 20]

X and Y may independently be $C_nH_{2n+1}$, n may be a natural number selected from 1 to 5.

The liquid crystal compound represented by Formula 2 may be in an amount ranging from about 10 wt % to about 30 wt % of the liquid crystal composition. Each of the liquid crystal compounds represented by Formulae 3, 6, and 7 may be in an amount ranging from about 5 wt % to about 15 wt % of the liquid crystal composition. The liquid crystal compound represented by Formula 4 may be in an amount ranging from about 3 wt % to about 10 wt % of the liquid crystal composition. The liquid crystal compound represented by Formula 5 may be in an amount ranging from about 10 wt % to about 35 wt % of the liquid crystal composition. Each of the liquid crystal compounds represented by Formulae 8, 9, and 10 may be in an amount ranging from about 3 wt % to about 25 wt % of the liquid crystal composition.

The liquid crystal compounds represented by Formulae 11, 14, and 15 may be in an amount ranging from about 5 wt % to about 25 wt % of the liquid crystal composition. Each of the liquid crystal compounds represented by Formulae 12 and 13 may be in an amount ranging from about 5 wt % to about 20 wt % of the liquid crystal composition. The liquid crystal compound represented by Formula 16 may be in an amount ranging from about 1 wt % to about 15 wt % of the liquid crystal composition. The liquid crystal compound represented by Formula 17 may be in an amount ranging from about 0.03 wt % to about 5 wt % of the liquid crystal composition. Each of the liquid crystal compounds represented by Chemical Formulae 18, 19, and 20 may be in an amount ranging from about 5 wt % to about 20 wt % of the liquid crystal composition.

A rotational viscosity of the liquid crystal composition may be less than or equal to about 100 mPa·s.

One or more exemplary embodiments of the present invention provide a liquid crystal display. The liquid crystal display includes a first substrate, a second substrate, and a liquid crystal layer. The second substrate is positioned above and overlaps the first substrate. The liquid crystal layer is disposed between the first substrate and the second substrate. The liquid crystal layer includes a liquid crystal compound represented by the following Formula 1.

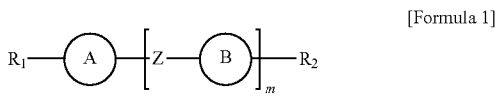
[Formula 1]

is selected from

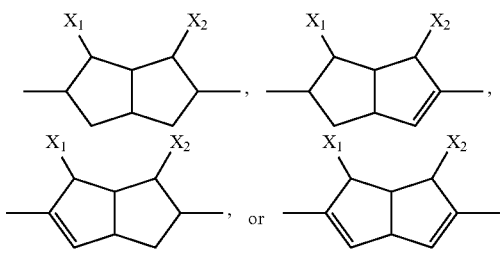

$X_1$ and $X_2$ are each independently selected from fluorine, $CF_3$, or $C_nH_{2n+1}$. Z is selected from a single bond, a double bond, $CF_2CF_2$, $OCF_2$, or $CF_2O$. $R_1$ is selected from hydrogen, fluorine, $CF_3$, $C_nH_{2n+1}$, or $C_nH_{2n+1}O$. $R_2$ is selected from hydrogen, fluorine, $CF_3$, $C_nH_{2n+1}$, or $OC_nH_{2n+1}$.

B is selected from

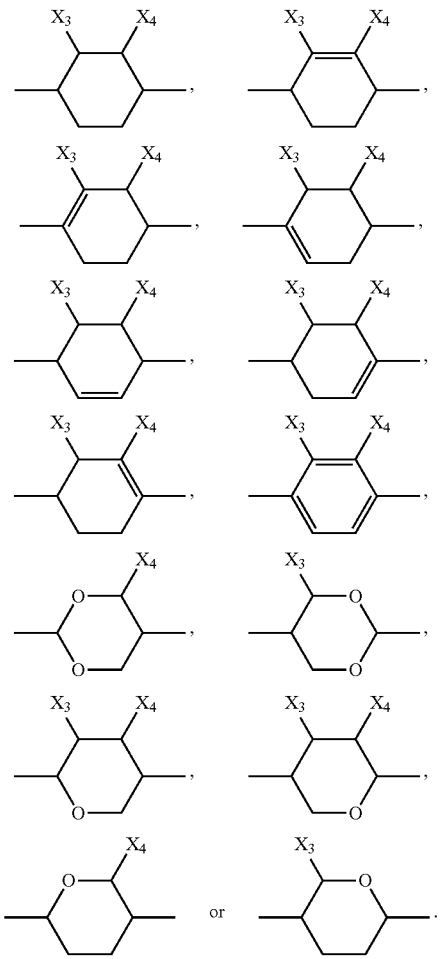

$X_3$ and $X_4$ are each independently selected from hydrogen, fluorine, $CF_3$, or $C_nH_{2n+1}$, m is a natural number selected from 1 or 2, n may be a natural number selected from 1 to 5.

The liquid crystal compound represented by Formula 1 may be in an amount ranging from about 1 wt % to about 20 wt % of the liquid crystal layer.

The liquid crystal compound represented by Formula 1 may include a liquid crystal compound represented by the following Formulae 1-1 to 1-5.

[Formula 1-1]

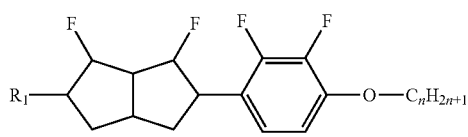

[Formula 1-2]

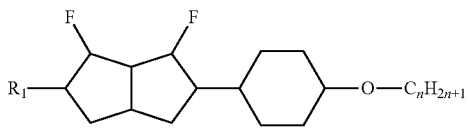

[Formula 1-3]

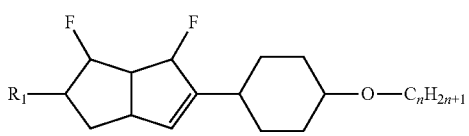

[Formula 1-4]

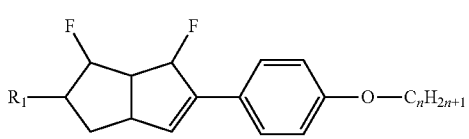

[Formula 1-5]

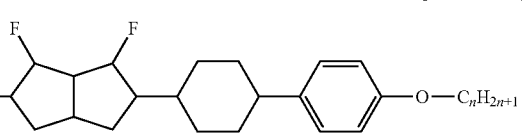

$R_1$ may be selected from hydrogen, fluorine, $CF_3$, $C_nH_{2n+1}$, or $C_nH_{2n+1}O$, n may be a natural number selected from 1 to 5.

The liquid crystal compound represented by Formula 1 may include a liquid crystal compound represented by the following Formulae 1-6 to 1-10.

[Formula 1-6]

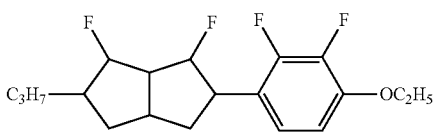

[Formula 1-7]

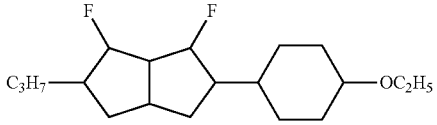

[Formula 1-8]

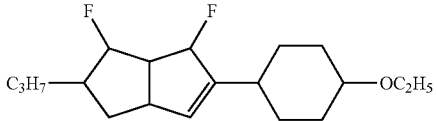

[Formula 1-9]

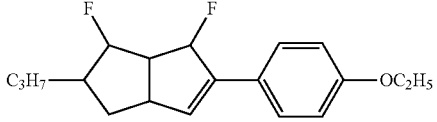

[Formula 1-10]

The liquid crystal layer may further include at least one liquid crystal compound selected liquid crystal compounds represented by the following Formulae 2 to 10.

[Formula 2]
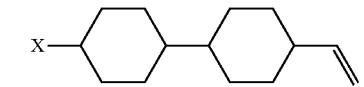

[Formula 3]
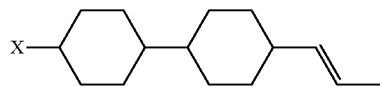

[Formula 4]
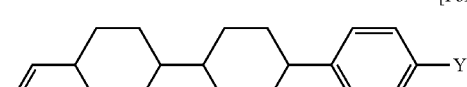

[Formula 5]
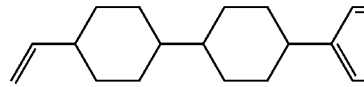

[Formula 6]
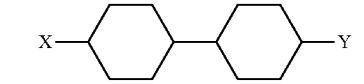

[Formula 7]
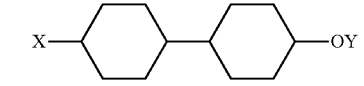

[Formula 8]
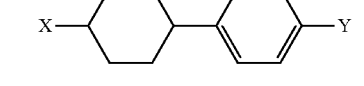

[Formula 9]
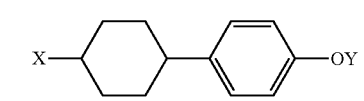

[Formula 10]
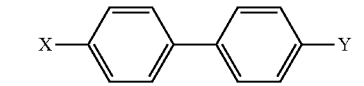

X and Y may each independently be $C_nH_{2n+1}$, n may be a natural number selected from 1 to 5.

The liquid crystal layer may further include at least one liquid crystal compound selected from liquid crystal compounds represented by the following Formulae 11 to 20.

[Formula 11]
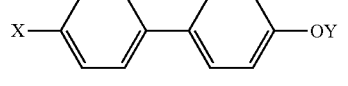

[Formula 12]
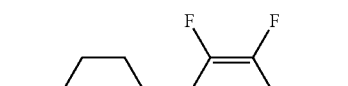

[Formula 13]
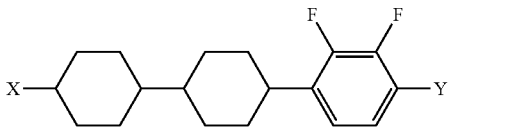

[Formula 14]
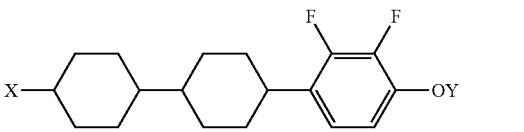

[Formula 15]
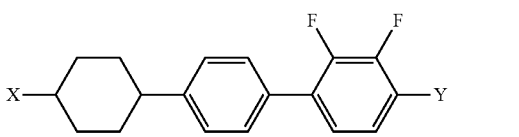

[Formula 16]
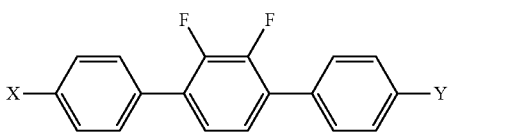

[Formula 17]
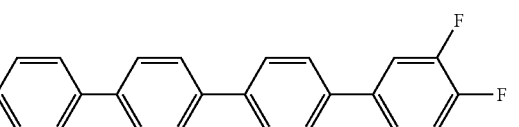

[Formula 18]
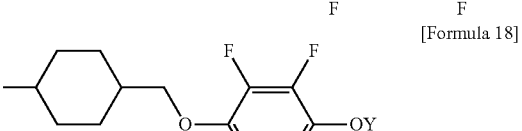

[Formula 19]
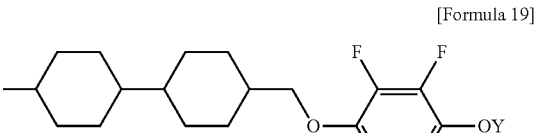

[Formula 20]
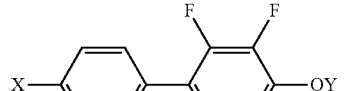

X and Y may each independently be $C_nH_{2n+1}$, n may be a natural number selected from 1 to 5.

The liquid crystal compound represented by Formula 2 may be in an amount ranging from about 10 wt % to about 30 wt % of the liquid crystal layer. Each of the liquid crystal compounds represented by Formulae 3, 6, and 7 may be in an amount ranging from about 5 wt % to about 15 wt % of the liquid crystal layer. The liquid crystal compound represented by Formula 4 may be in an amount ranging from about 3 wt % to about 10 wt % of the liquid crystal layer. The liquid crystal compound represented by Formula 5 may be in an amount ranging from about 10 wt % to about 35 wt % of the liquid crystal layer. Each of the liquid crystal compounds represented by Formulae 8, 9, and 10 may be in an amount ranging from about 3 wt % to about 25 wt % of the liquid crystal layer.

Each of the liquid crystal compounds represented by Formulae 11, 14, and 15 may be in an amount ranging from about 5 wt % to about 25 wt % of the liquid crystal layer. Each of the liquid crystal compounds represented by Formulae 12 and 13 may be in an amount ranging from about 5 wt % to about 20 wt % of the liquid crystal layer. The liquid crystal compound represented by Formula 16 may be in an amount ranging from about 1 wt % to about 15 wt % of the liquid crystal layer. The liquid crystal compound represented by Formula 17 may be in an amount ranging from about 0.03 wt % to about 5 wt % of the liquid crystal layer. Each of the liquid crystal compounds represented by Formulae 18, 19, and 20 may be in an amount ranging from about 5 wt % to about 20 wt % of the liquid crystal layer.

A rotational viscosity of the liquid crystal composition may be less than or equal to about 100 mPa·s.

The liquid crystal display may further include a pixel electrode and a common electrode. The pixel electrode may be disposed on the first substrate. The common electrode may be disposed on the second substrate.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION OF THE EMBODIMENTS

Figure 1:
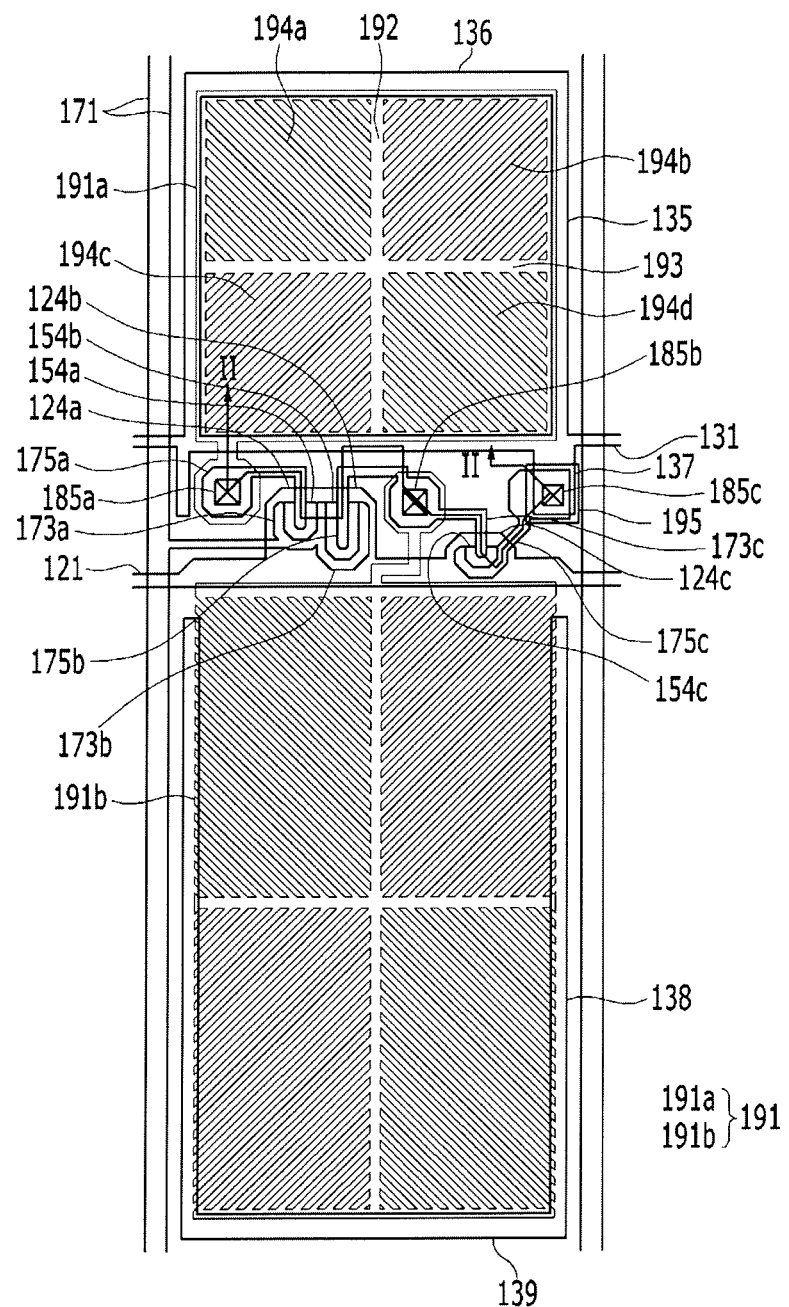
FIG. 1 is a layout view illustrating a liquid crystal display according to an exemplary embodiment of the present invention.

Exemplary embodiments of the present invention will be described below in more detail with reference to the accompanying drawings. In this regard, the exemplary embodiments may have different forms and should not be construed as being limited to the exemplary embodiments of the present invention described herein. Like reference numerals may refer to like elements throughout the specification and drawings.

It will become understood that although the terms "first" and "second" may be used herein to describe various components, these components should not be limited by these terms.

Sizes of elements in the drawings may be exaggerated for clarity of description.

It will be understood that when a component, such as a layer, a film, a region, or a plate, is referred to as being "on" another component, the component can be directly on the other component or intervening components may be present.

A liquid crystal composition according to an exemplary embodiment of the present invention may include a liquid crystal compound represented by the following Formula 1.

[Formula 1]

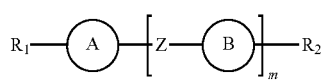

In Formula 1,

may be selected from

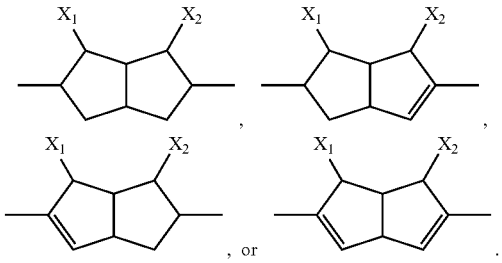

$X_1$ and $X_2$ may each independently be selected from fluorine, $CF_3$ or $C_nH_{2n+1}$, n may be a natural number selected from 1 to 5.

Z may be selected from a single bond, a double bond, $CF_2CF_2$, $OCF_2$, or $CF_2O$.

The single bond and the double bond described herein may refer to a structure in which two neighboring groups are directly bonded to each other without an intermediate group.

$R_1$ may be selected from hydrogen, fluorine, $CF_3$, $C_nH_{2n+1}$, or $C_nH_{2n+1}O$, n may be a natural number selected from 1 to 5.

$R_2$ may be selected from hydrogen, fluorine, $CF_3$, $C_nH_{2n+1}$, or $OC_nH_{2n+1}$, n may be a natural number selected from 1 to 5.

may be selected from,

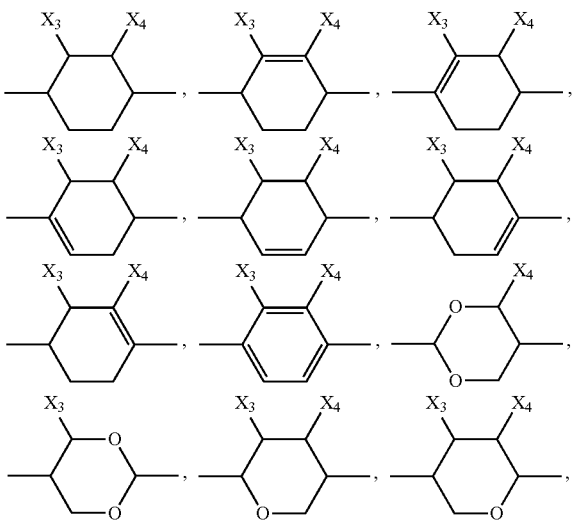

-continued

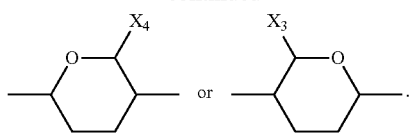

$X_3$ and $X_4$ may each independently be selected from hydrogen, fluorine, $CF_3$, or $C_nH_{2n+1}$, n may be a natural number selected from 1 to 5.

m may be a natural number selected from 1 or 2.

The liquid crystal compound represented by Formula 1 may be present in the range from about 1 wt % to about 20 wt % of the liquid crystal composition.

The liquid crystal compound represented by Formula 1 may include a liquid crystal compound selected from liquid crystal compounds represented by the following Formulae 1-1 to 1-5.

[Formula 1-1]
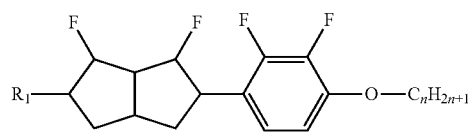

[Formula 1-2]
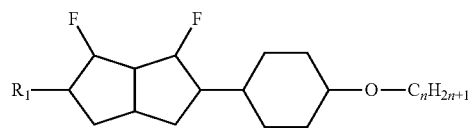

[Formula 1-3]
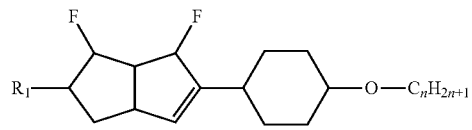

[Formula 1-4]
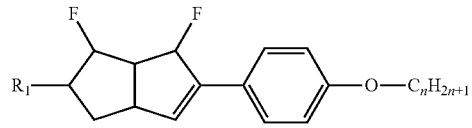

[Formula 1-5]
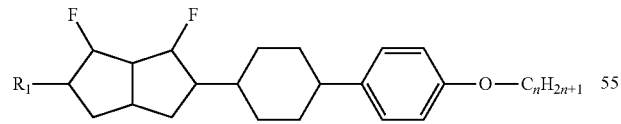

In Formulae 1-1 to 1-5, $R_1$ may be selected from hydrogen, fluorine, $CF_3$, $C_nH_{2n+1}$, or $C_nH_{2n+1}O$, n may be a natural number selected from 1 to 5.

The liquid crystal compound represented by Formula 1 may include a liquid crystal compound selected from liquid crystal compounds represented by the following Formulae 1-6 to 1-10.

[Formula 1-6]
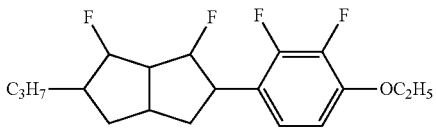

[Formula 1-7]
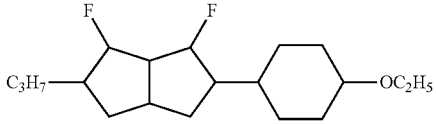

[Formula 1-8]
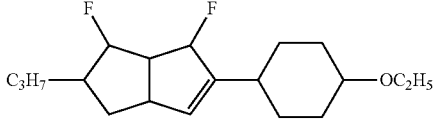

[Formula 1-9]
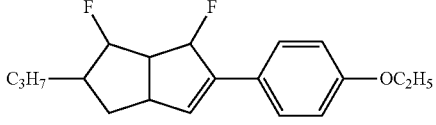

[Formula 1-10]

The liquid crystal compound represented by Formula 1 may have a structure in which at least two ring structures to three ring structures are connected to each other. Accordingly, a rotational viscosity may be relatively reduced in comparison with a liquid crystal compound having a structure in which at least three ring structures to five ring structures are connected to each other. An octane ring such as

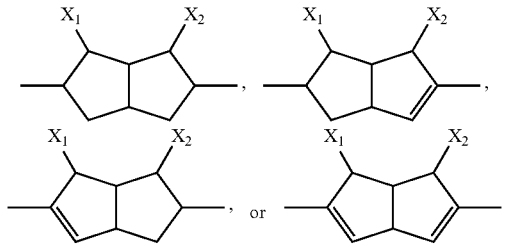

included in

of Formula 1 may be a single ring.

The rotational viscosity may relate to the response time of the liquid crystal. The rotational viscosity may increase as the length of the liquid crystal compound increases. However, since the number of ring structures of the liquid crystal compound of Formula 1 is a relatively small number, for example, two or three ring structures, the rotational viscosity may be relatively low. Due to a relatively low rotational viscosity, a relatively high response speed of the liquid crystal may be produced when the liquid crystal compound is included in a liquid crystal layer.

The liquid crystal compound having at least three ring structures to five ring structures included in the liquid crystal composition may have one to three ring structures in addition to the structure, for example, bicyclo[3,3,0]octane

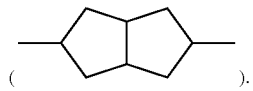

The one to three additional ring structures may include phenyl. The one to three additional ring structures may be added to obtain a relatively high dielectric anisotropy ($\Delta\varepsilon$). Since a length of a molecule may become longer, a phase transition temperature (Tni) may increase, however, the rotational viscosity may also increase. The phase transition temperature (Tni) may refer to a temperature at which the liquid crystal composition including liquid crystal compounds changes from a liquid crystal state to a liquid state. The higher the Tni, the higher the liquid crystal composition property may be maintained, for example, in a relatively high temperature environment.

The liquid crystal compound of Formula 1 according to an exemplary embodiment of the present invention may reduce the rotational viscosity and obtain a relatively high dielectric anisotropy ($\Delta\varepsilon$) and phase transition temperature (Tni), for example, by substituting substituents for bicycle[3,3,0]octane or similar structures.

The substituents $X_1$ and $X_2$ of each of cyclopentane and cyclopentene may be substituted, such as the structures represented by

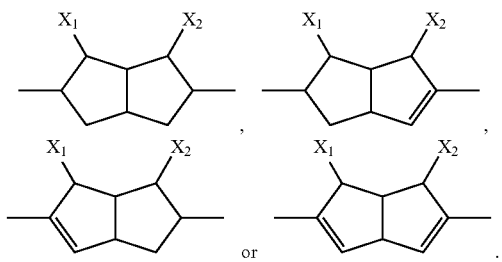

Thus, the liquid crystal compound of Formula 1 according to an exemplary embodiment of the present invention may have a relatively high dielectric anisotropy ($\Delta\varepsilon$). The term "high" may refer to that an absolute value of a permittivity is relatively large. Since the liquid crystal compound of Formula 1 according to an exemplary embodiment of the present invention may have a negative dielectric anisotropy, the liquid crystal composition including the liquid crystal compound of Formula 1 may be applicable to a liquid crystal display having a vertical electric field mode. However, the liquid crystal compound of Formula 1 may be applicable to a liquid crystal display having a coplanar electrode (CE) mode.

Exemplary rotational viscosities of the liquid crystal compounds of Comparative Examples 1 and 2 and the liquid crystal compound of Formula 1-6 are shown in Table 1 below.

[Comparative Example 1]

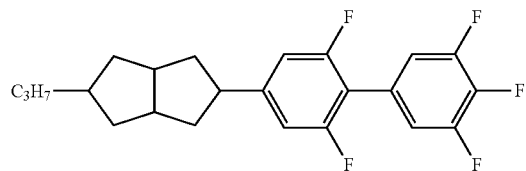

[Comparative Example 2]

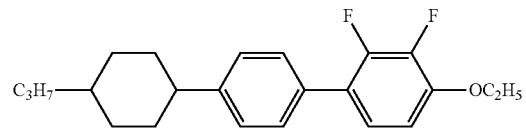

[Formula 1-6]

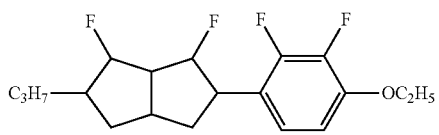

TABLE 1

|  | Comparative Example 1 | Comparative Example 2 | Formula 1-6 |
| --- | --- | --- | --- |
| Rotational viscosity (mPa · s) | 861.9 | 350 | 65.3 |

Comparing Comparative Example 1 and the liquid crystal compound of Formula 1-6, which includes the bicycle[3,3,0]octane ring, the liquid crystal compound of Comparative Example 1 does not include a substituent in bicycle[3,3,0]octane, and includes three ring structures. However, the bicycle[3,3,0]octane of the liquid crystal compound of Chemical Formula 1-6 includes a fluorine substituent, respectively, and includes two ring structures.

Comparing the exemplary rotational viscosities of the liquid crystal compound of Comparative Example 1 and the liquid crystal compound of Formula 1-6, the rotational viscosity of the liquid crystal compound of Comparative Example 1 may be about 861.9 mPa·s and the rotational viscosity of the liquid crystal compound of Chemical Formula 1-6 may be about 65.3 mPa·s. Thus, the liquid crystal compound of Formula 1-6 may have a rotational viscosity that is decreased by about 10 times or more as compared with a rotational viscosity of the liquid crystal compound of Comparative Example 1.

Formula 1-6 may have an end structure of —$C_3H_7$, —$OC_2H_5$. The liquid crystal compound of Comparative Example 2, which may have the same end structure as Formula 1-6, includes three ring structures. The three ring structures may include cyclohexane, benzene, or benzene having a fluorine substituent. However, the liquid crystal compound of Chemical Formula 1-6 may include two ring structures. The two ring structure may include bicycle[3,3,0]octane having a fluorine substituent, and a benzene ring having a fluorine substituent.

Comparing the exemplary rotational viscosities of the liquid crystal compound of Comparative Example 2 and the liquid crystal compound of Formula 1-6, the rotational viscosity of the liquid crystal compound of Comparative Example 2 may be about 350 mPa·s and the rotational viscosity of the liquid crystal compound of Formula 1-6 may be about 65.3 mPa·s. Thus, the liquid crystal compound of Formula 1-6 may have a rotational viscosity that is decreased by about 5 times or more as compared with a rotational viscosity of the liquid crystal compound of Comparative Example 2.

Exemplary refractive anisotropy (Δt), nisotdielectric anisotropy (Δε), ielecrotation viscosity (γ1), and phase transition temperature (Tni) for each of liquid crystal compounds of Chemical Formulae 1-6 to 1-10 are shown in below Table 2.

The liquid crystal compound of Formula 1 included in the liquid crystal composition according to an exemplary embodiment of the present invention may have a relatively lower rotational viscosity than other liquid crystal compounds. Accordingly, when the liquid crystal composition including the liquid crystal compound of Formula 1 is included in the liquid crystal display, a response speed of the liquid crystal display may be increased, for example, by the relatively low rotational viscosity.

The liquid crystal composition according to an exemplary embodiment of the present invention may include at least one liquid crystal compound of the following Formulae 2 to 10.

TABLE 2

| Structure | Δt | Δε | γ1 (mPa·s) | Tni (tur) |
|---|---|---|---|---|
| [Formula 1-6] (C$_3$H$_7$–bicyclopentane(F,F)–phenyl(F,F)–OC$_2$H$_5$) | 0.044 | −5.55 | 65.3 | 71 |
| [Formula 1-7] (C$_3$H$_7$–bicyclopentane(F,F)–cyclohexyl–OC$_2$H$_5$) | 0.011 | −3.1 | 115.4 | 84.8 |
| [Formula 1-8] (C$_3$H$_7$–bicyclopentene(F,F)–cyclohexyl–OC$_2$H$_5$) | 0.043 | −3.11 | 113 | 87.1 |
| [Formula 1-9] (C$_3$H$_7$–bicyclopentene(F,F)–phenyl–OC$_2$H$_5$) | 0.084 | −2.88 | 96.4 | 87.8 |
| [Formula 1-10] (C$_3$H$_7$–bicyclopentane(F,F)–cyclohexyl–phenyl–OC$_2$H$_5$) | 0.051 | −3.29 | 162.4 | 134.7 |

Referring to Table 2, the liquid crystal compounds of Formulae 1-6 to 1-10 may each have a relatively low rotational viscosity. Further, the liquid crystal compounds of Formulae 1-6 to 1-10 may maintain a similar level of the properties of refractive index anisotropy (Δt), dielectric anisotropy (Δε), and phase transition temperature (Tni) to other liquid crystal compounds.

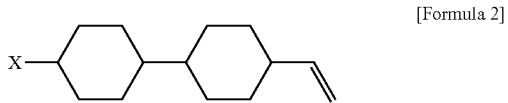

[Formula 2]

-continued

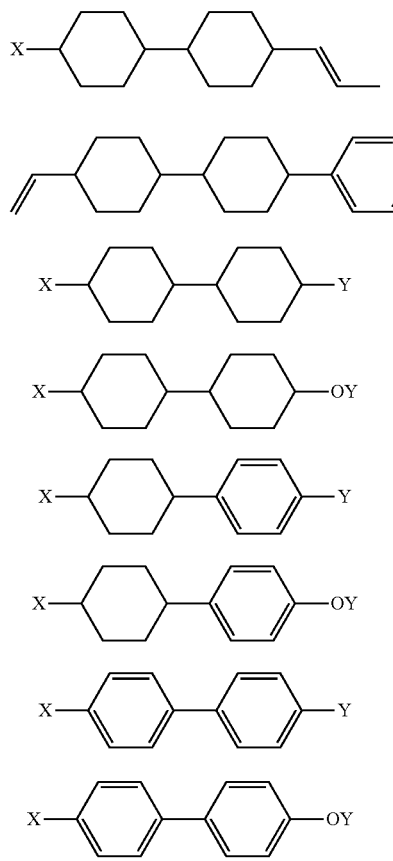

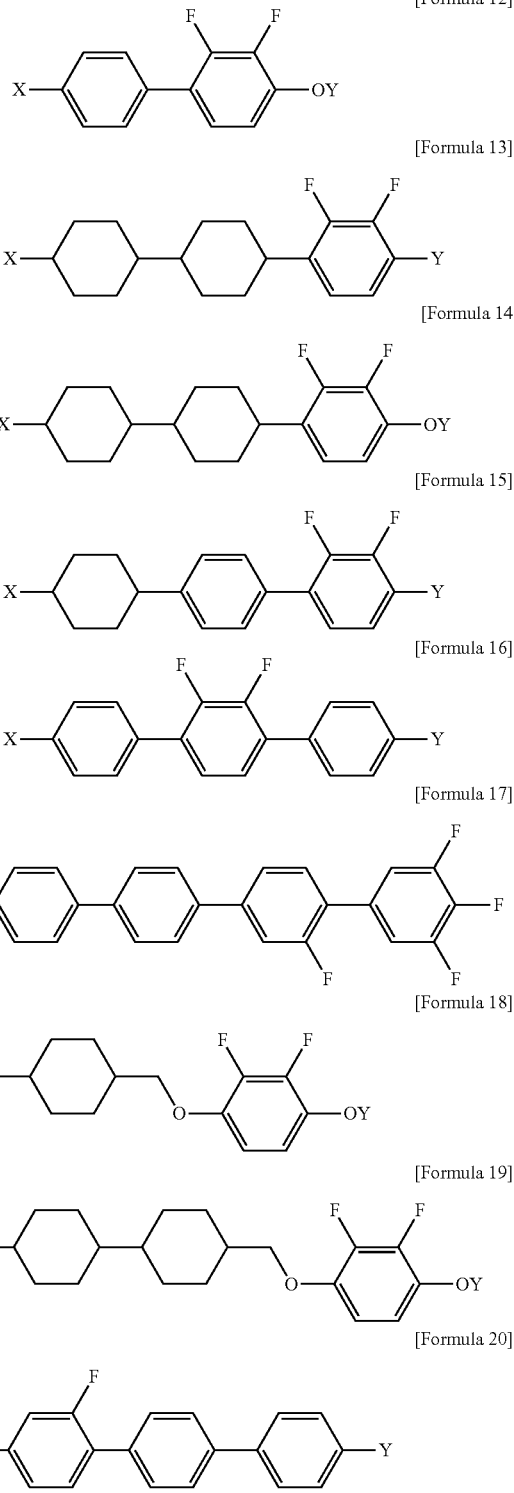

In Formulae 2 to 10, X and Y may each independently be $C_nH_{2n+1}$, n may be a natural number selected from 1 to 5.

The liquid crystal compound represented by Formula 2 may be present in an amount ranging from about 10 wt % to about 30 wt % of the liquid crystal composition. The liquid crystal compounds represented by Formulae 3, 6, and 7 may each be present in an amount ranging from about 5 wt % to about 15 wt % of the liquid crystal composition. The liquid crystal compound represented by Formula 4 may be present in an amount ranging from about 3 wt % to about 10 wt % of the liquid crystal composition. The liquid crystal compound represented by Formula 5 may be present in an amount ranging from about 10 wt % to about 35 wt % of the liquid crystal composition. The liquid crystal compounds represented by Chemical Formulae 8, 9, and 10 may each be present in an amount ranging from about 3 wt % to about 25 wt % of the liquid crystal composition.

The liquid crystal composition according to an exemplary embodiment of the present invention may include at least one liquid crystal compound of the following Formulae 11 to 20.

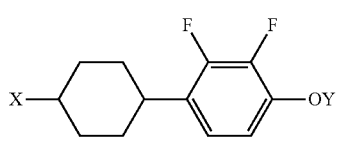

[Formula 11]

In Formulae 11 to 20, X and Y may each independently be $C_nH_{2n+1}$, n may be a natural number selected from 1 to 5.

The liquid crystal compounds represented by Formulae 11, 14, and 15 may each be present in an amount ranging from about 5 wt % to about 25 wt % of the liquid crystal composition. The liquid crystal compounds represented by Formulae 12 and 13 may each be present in an amount ranging from about 5 wt % to about 20 wt % of the liquid crystal composition. The liquid crystal compound represented by Formula 16 may be present in an amount ranging from about 1 wt % to about 15 wt % of the liquid crystal composition. The liquid crystal compound represented by Formula 17 may be present in an amount ranging from about 0.03 wt % to about 5 wt % of the liquid crystal composition. The liquid crystal compounds represented by Formulae 18, 19, and 20 may each be present in an amount ranging from about 5 wt % to about 20 wt % of the liquid crystal composition.

The rotational viscosity of the liquid crystal composition according to an exemplary embodiment of the present invention may be less than or equal to about 100 mPa·s.

Since the liquid crystal composition according to an exemplary embodiment of the present invention may include the liquid crystal compound represented by Formula 1, a response speed of the liquid crystal display may be relatively increased by decreasing the increase in a rotational viscosity while having a negative dielectric constant anisotropy similar to other liquid crystal compositions.

The liquid crystal composition according to an exemplary embodiment of the present invention (Embodiment 1) and the liquid crystal composition according to a comparative example of the present invention (Comparative Example 3) may be prepared as shown in Table 3 (Embodiment 1) and Table 4 (Comparative Example 3) below. Exemplary properties are illustrated below.

TABLE 3

| No. | Liquid Crystal Compound | wt % |
|---|---|---|
| 1 | | 3-25 |
| 2 | | 3-25 |
| 3 | | 5-20 |
| 4 | | 5-25 |
| 5 | | 3-25 |
| 6 | | 5-30 |
| 7 | | 5-25 |
| 8 | | 10-30 |
| 9 | | 5-15 |
| 10 | | 5-30 |

TABLE 3-continued
| No. | Liquid Crystal Compound | wt % |
|---|---|---|
| 11 | 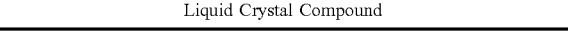 | 5-25 |
TABLE 4
| No. | Liquid Crystal Compound | wt % |
|---|---|---|
| 1 | 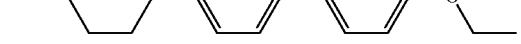 | 3-25 |
| 2 | 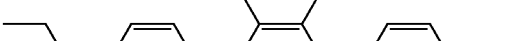 | 3-25 |
| 3 | 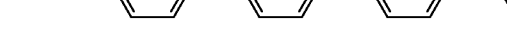 | 5-20 |
| 4 |  | 5-25 |
| 5 |  | 3-25 |
| 6 | 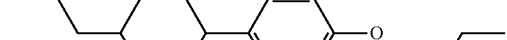 | 5-30 |
| 7 |  | 5-25 |
| 8 |  | 10-30 |
| 9 |  | 5-15 |
| 10 |  | 5-30 |

TABLE 4-continued

| No. | Liquid Crystal Compound | wt % |
|---|---|---|
| 11 | 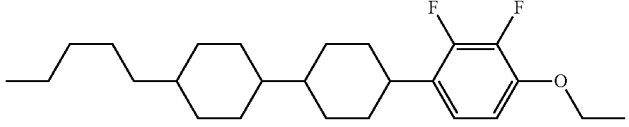 [SMILES: CCCCCC1CCC(C2CCC(c3ccc(OCC)c(F)c3F)CC2)CC1] | 5-25 |

The liquid crystal composition of Embodiment 1 prepared as shown in Table 3 and the liquid crystal composition of Comparative Example 3 as shown in Table 4 may have substantially the same composition and content except for the structural formula of the fifth liquid crystal compound. The fifth liquid crystal compound of Embodiment 1 may be the liquid crystal compound of Formula 1-6. The fifth liquid crystal compound of Comparative Example 3 may include three ring structures. The fifth liquid crystal compound of Comparative Example 3 might not be included in Chemical Formula 1 as described herein.

Exemplary properties of the liquid crystal compositions of Embodiment 1 and Comparative Example 3 are shown in below Table 5. The properties are refractive anisotropy (ni), dielectric anisotropy (Δε), elerotation viscosity (γo), and phase transition temperature (Tni).

TABLE 5

| | ni | Δε | γo (mPa · s) | Tni (eon) |
|---|---|---|---|---|
| Embodiment 1 | 0.105 | −3.12 | 94 | 75 |
| Comparative Example 3 | 0.106 | −3.13 | 124 | 74 |

Referring to Table 5, the liquid crystal composition of Embodiment 1 including the liquid crystal compound represented by Formula 1-6 may have a relatively lower rotational viscosity than a rotational viscosity of the liquid crystal composition of Comparative Example 3, which includes a compound of a

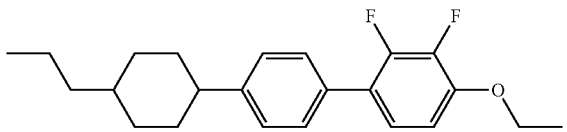 [SMILES: CCCC1CCC(c2ccc(-c3ccc(OCC)c(F)c3F)cc2)CC1]

structure. The rotational viscosity of the liquid crystal composition of Comparative Example 3 may be about 124 mPa·s. The rotational viscosity of the liquid crystal composition of Embodiment 1 may be about 94 mPa·s. Thus, the rotational viscosity of the liquid crystal composition of Embodiment 1 may be decreased by about 30% or more in relation to the rotational viscosity of the liquid crystal composition of Comparative Example 3. A decrease in the rotational viscosity may increase the response speed when the liquid crystal composition is included in the liquid crystal display.

Referring to Table 5, the other properties of the liquid crystal composition of Embodiment 1 may have a similar or same level as the properties of the liquid crystal composition of Comparative Example 3. Therefore, according to an exemplary embodiment of the present invention, the rotational viscosity may only be reduced and the other properties such as the dielectric anisotropy (Δε), the refractive anisot-ropy (ni), and the phase transition temperature (Tni) might not be reduced in the liquid crystal composition.

The liquid crystal display device including a liquid crystal layer according to an exemplary embodiment of the present invention will be described in more detail below.

A structure of a liquid crystal display is not limited to the examples set forth herein. For example, the liquid crystal display according to an exemplary embodiment of the present invention may be a vertical alignment (VA) mode liquid crystal display.

An arrangement of a lower panel and an upper panel included in a liquid crystal display according to an exemplary embodiment of the present invention will be described in more detail below with reference to FIGS. 1 and 2.

FIG. 1 is a layout view illustrating a liquid crystal display according to an exemplary embodiment of the present invention. FIG. 2 is a cross-sectional view illustrating a liquid crystal display of FIG. 1 taken along a line II-II according to an exemplary embodiment of the present invention.

A lower panel 100 will be described in more detail below.

A gate conductor may be disposed on a substrate 110. The gate conductor may include a gate line 121 and a voltage division reference voltage line 131. The substrate 110 may be an insulating substrate. The substrate 110 may include transparent glass or plastic.

The gate line 121 may include a first gate electrode 124a, a second gate electrode 124b, a third gate electrode 124c, and a wide end portion. The wide end portion may connect to another layer. Alternatively, the wide end portion may connect to an external driving circuit.

The voltage division reference voltage line 131 may include first storage electrodes 135 and 136 and a reference electrode 137. Second storage electrodes 138 and 139 may be positioned on the lower panel 100. The second storage electrodes 138 and 139 might not be connected to the voltage division reference voltage line 131. The second storage electrodes 138 and 139 may overlap a second sub-pixel electrode 191b.

A gate insulating layer 140 may be disposed on each of the gate line 121 and the voltage division reference voltage line 131.

A semiconductor layer may be disposed on the gate insulating layer 140. The semiconductor layer may include a first semiconductor 154a, a second semiconductor 154b, and a third semiconductor 154c.

A plurality of ohmic contacts 163a, 165a, 163b, 165b, 163c, and 165c may be disposed on the semiconductors layers 154a, 154b, and 154c.

A data line 171, a first source electrode 173a, a second source electrode 173b, and a plurality of data conductors may be disposed on each of the ohmic contacts 163a, 165a, 163b, 165b, 163c, and 165c and the gate insulating layer 140. The second source electrode 173b may be connected to the data line 171. The data conductors may include a first drain electrode 175*a*, a second drain electrode 175*b*, a third source electrode 173*c*, and a third drain electrode 175*c*.

The data line 171 may include a relatively wide end portion. The relatively wide end portion may connect to another layer. Alternatively, the wide end portion may connect to an external driving circuit.

Each of the first to third gate electrodes 124*a*, 124*b*, and 124*c*, the first to third source electrodes 173*a*, 173*b*, and 173*c*, and the first to third drain electrodes 175*a*, 175*b*, and 175*c* may respectively form thin film transistors, for example, with island semiconductors.

A first passivation layer 180*p* may be disposed on each of the data conductors and exposed portions of the first to third semiconductors 154*a*, 154*b*, and 154*c*.

A color filter 230 may be disposed on the first passivation layer 180*p*. However, the color filter 230 might not be disposed in the lower display panel 100. For example, the color filter 230 may be disposed in the upper display panel 200.

A second passivation layer 180*p* may be disposed on the color filter 230.

A first contact hole 185*a* and a second contact hole 185*b* may be formed in each of the first passivation layer 180*p* and the second passivation layer 180*q*. The first drain electrode 175*a* and the first sub-pixel electrode 191*a* may be connected to each other through the first contact hole 185*a*. The second drain electrode 175*b* and the second sub-pixel electrode 191*b* may be connected to each other through the second contact hole 185*b*.

A third contact hole 185*c* may be formed in each of the first passivation layer 180*p*, the second passivation layer 180*q*, and the gate insulating layer 140. The third contact hole 185*c* may be covered by a connecting member 195. The connecting member 195 may electrically connect the reference electrode 137 and the third drain electrode 175*c* to each other, for example, through the third contact hole 185*c*.

A plurality of pixel electrodes 191 may be disposed on the second passivation layer 180*q*. The first sub-pixel electrode 191*a* and the second sub-pixel electrode 191*b* may be spaced apart from each other. The gate line 121 may be disposed between the first sub-pixel electrode 191*a* and the second sub-pixel electrode 191*b*. The first sub-pixel electrode 191*a* and the second sub-pixel electrode 191*b* may be adjacent to each other, for example, in a column direction, with respect to the gate line 121. The pixel electrodes 191 may include a transparent conductive material such as indium-tin oxide (ITO) or indium-zinc oxide (IZO). Alternatively, the pixel electrodes 191 may include a reflective metal such as aluminum (Al), silver (Ag), chromium (Cr), or an alloy thereof.

The first sub-pixel electrode 191*a* may include a cross-shaped stem. The cross-shaped stem may have a transverse stem 193 and a longitudinal stem 192. The transverse stem 193 and the longitudinal stem 192 may be crossed with each other. The first sub-pixel electrode 191*a* may be divided into four sub-regions by the transverse stem 193 and the longitudinal stem 192. Each of the sub-regions may include a plurality of first fine branch portions 194*a*, a plurality of second fine branch portions 194*b*, a plurality of third fine branch portions 194*c*, and a plurality of fourth fine branch portions 194*d*, respectively.

The shape of the second sub-pixel electrode 191*b* may be similar to a shape of the first sub-pixel electrode 191*a*.

The first sub-pixel electrode 191*a* and the second sub-pixel electrode 191*b* may each be electrically connected to the first drain electrode 175*a* and the second drain electrode 175*b* through the first contact hole 185*a* and the second contact hole 185*b*, respectively. The first sub-pixel electrode 191*a* and the second sub-pixel electrode 191*b* may each receive the data voltage from the first drain electrode 175*a* and the second drain electrode 175*b*, respectively. A portion of the data voltage applied to the second drain electrode 175*b* may be divided by the third source electrode 173*c*. Thus, a voltage applied to the first sub-pixel electrode 191*a* may be greater than a voltage applied to the second sub-pixel electrode 191*b*.

The first sub-pixel electrode 191*a* and the second sub-pixel electrode 191*b*, to which the data voltage is applied, may each generate an electrical field with a common electrode 270 of an upper display panel 200. Thus, a direction of liquid crystal molecules of the liquid crystal layer 3 disposed between the two electrodes 191 and 270 may be determined. Luminance of light that passes through a liquid crystal layer 3 may be varied according to a direction of liquid crystal molecules 31. A lower alignment layer 11 may be disposed on the pixel electrode 191.

The upper panel 200 will be described in more detail below.

Figure 2:
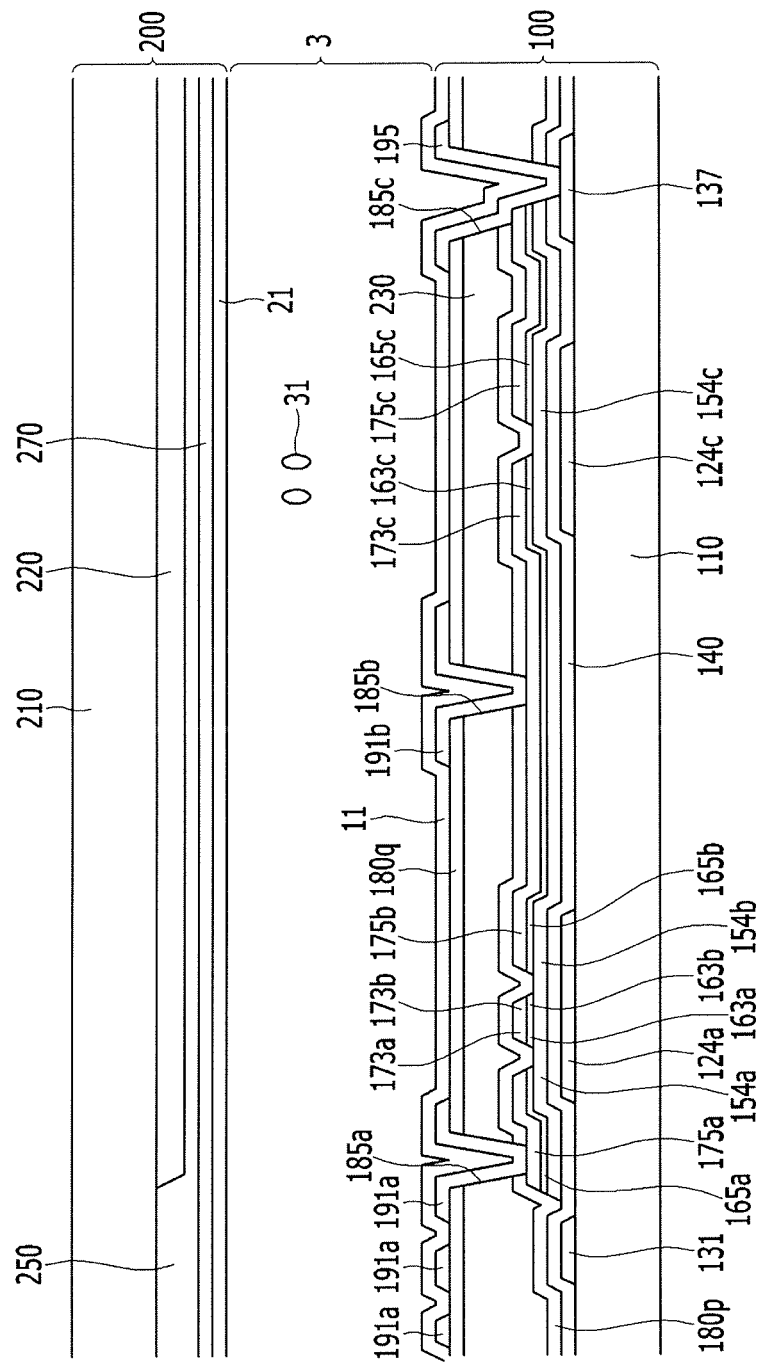
FIG. 2 is a cross-sectional view illustrating a liquid crystal display of FIG. 1 taken along a line II-II according to an exemplary embodiment of the present invention.

Referring to FIGS. 1 and 2, a second substrate 210 may be positioned above the first substrate 110. The second substrate 210 may overlap the first substrate 110. A black matrix 220 may be disposed between the liquid crystal layer 3 and the second substrate 210. The black matrix 220 may be disposed in the upper panel 200 to correspond to a region of the lower panel 100 in which the data lines 171 are disposed and a region in which thin film transistors are disposed.

An overcoat 250 may be disposed between the liquid crystal layer 3 and the black matrix 220. However, the overcoat layer 250 may be omitted. The common electrode 270 may be disposed between the liquid crystal layer 3 and the overcoat 250. An upper alignment layer 21 may be disposed between the liquid crystal layer 3 and the common electrode 270.

The liquid crystal layer 3 may be disposed between the lower panel 100 and the upper panel 200. The liquid crystal layer 3 may include the liquid crystal composition according to an exemplary embodiment of the present invention. The liquid crystal layer 3 of the liquid crystal display according to an exemplary embodiment of the present invention may include the liquid crystal compound represented by the following Formula 1.

[Formula 1]

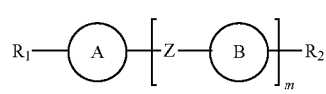

In Formula 1,

may be selected from

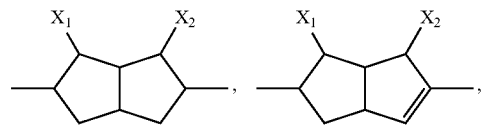

-continued

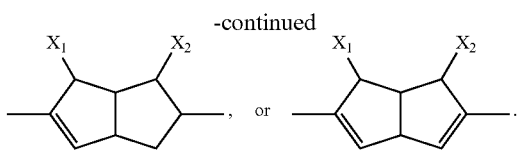

$X_1$ and $X_2$ may each independently be selected from fluorine, $CF_3$, or $C_nH_{2n+1}$, n may be a natural number selected from 1 to 5.

Z may be selected from a single bond, a double bond, $CF_2CF_2$, $OCF_2$, or $CF_2O$.

$R_1$ may be selected from hydrogen, fluorine, $CF_3$, $C_nH_{2n+1}$, or $C_nH_{2n+1}O$, n may be a natural number selected from 1 to 5.

$R_2$ may be selected from hydrogen, fluorine, $CF_3$, $C_nH_{2n+1}$, or $OC_nH_{2n+1}$, n may be a natural number selected from 1 to 5.

may be selected from

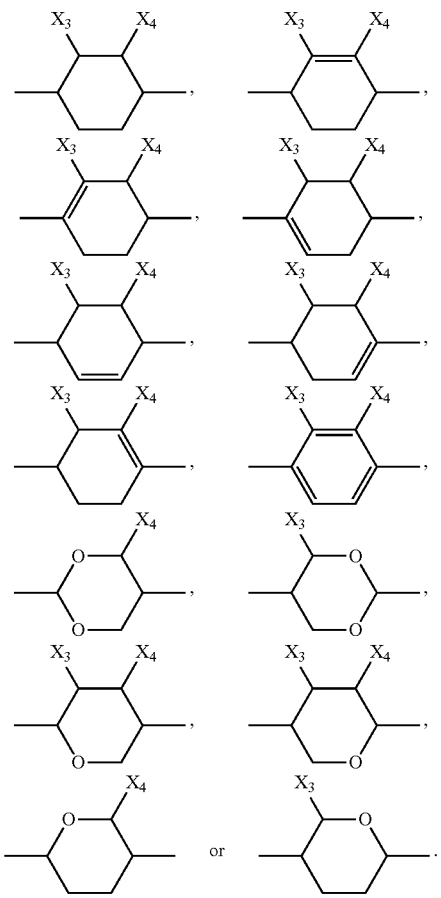

$X_3$ and $X_4$ may each independently be selected from hydrogen, fluorine, $CF_3$, or $C_nH_{2n+1}$, n may be a natural number selected from 1 to 5.

m may be a natural number selected from 1 or 2.

The liquid crystal composition including the liquid crystal layer 3 is substantially the same as described herein. Thus, description of similar constituent elements may be omitted.

In the liquid crystal display including the liquid crystal compound represented by Formula 1 as the liquid crystal layer, the rotational viscosity of the liquid crystal layer may be relatively lower than a rotational viscosity of other liquid crystal displays. Thus, the response speed of the liquid crystal display device may be relatively increased.

[Formula 1]

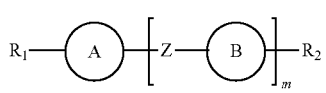

However, the liquid crystal display according to the structure of FIGS. 1 and 2 is only one example, and the liquid crystal composition according to an exemplary embodiment of the present invention may be variously applied to a vertical alignment (VA) mode liquid crystal display or a coplanar electrode (CE) mode liquid crystal display.

While exemplary embodiments of the present invention have been described herein, it is to be understood that the present invention is not limited to the disclosed exemplary embodiments, but, on the contrary, is intended to cover various modifications and equivalent arrangements included within the spirit and scope of the present invention.

What is claimed is:

1. A liquid crystal composition, comprising a liquid crystal compound represented by Formula 1:

[Formula 1]

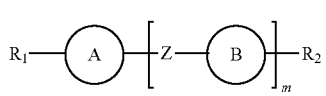

wherein

is selected from

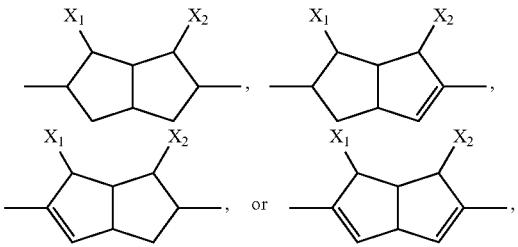

$X_1$ and $X_2$ are each independently selected from fluorine, $CF_3$, or $C_nH_{2n+1}$, Z is selected from a single bond, a double bond, $CF_2CF_2$, $OCF_2$, or $CF_2O$, $R_1$ is selected from hydrogen, fluorine, $CF_3$, $C_nH_{2n+1}$, or $C_nH_{2n+1}O$, $R_2$ is selected from hydrogen, fluorine, $CF_3$, $C_nH_{2n+1}$, or $OC_nH_{2n+1}$,

is selected from

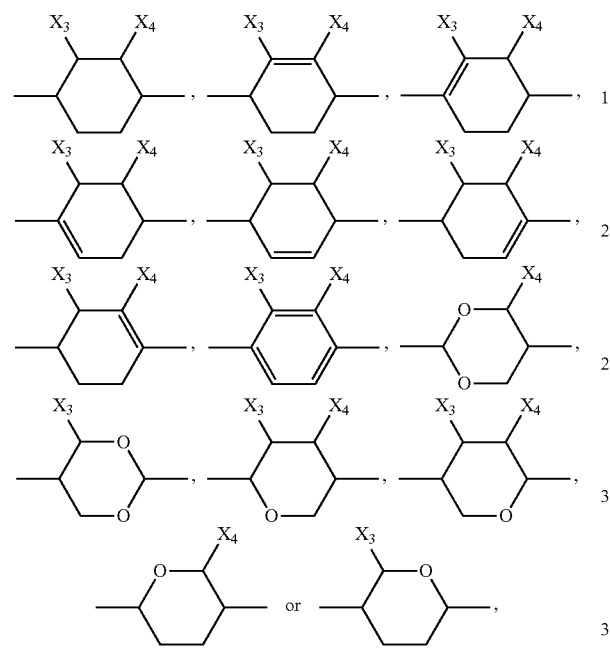

$X_3$ and $X_4$ are each independently selected from hydrogen, fluorine, $CF_3$, or $C_nH_{2n+1}$, m is a natural number selected from 1 or 2, and n is a natural number selected from 1 to 5.

2. The liquid crystal composition of claim 1, wherein the liquid crystal compound represented by Formula 1 is in an amount ranging from about 1 wt % to about 20 wt % of the liquid crystal composition.

3. The liquid crystal composition of claim 1, wherein the liquid crystal compound represented by Formula 1 comprises a liquid crystal compound represented by the following Formulae 1-1 to 1-5:

[Formula 1-1]

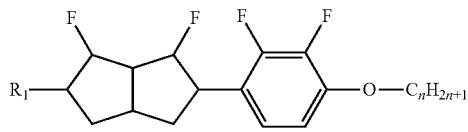

[Formula 1-2]

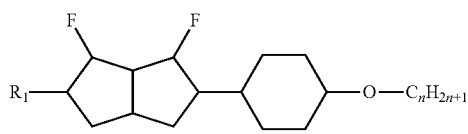

[Formula 1-3]

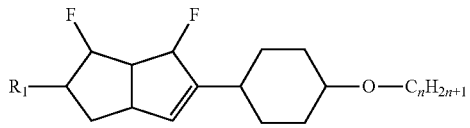

[Formula 1-4]

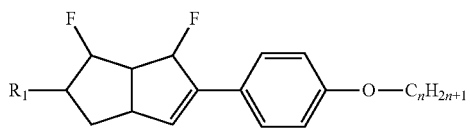

[Formula 1-5]

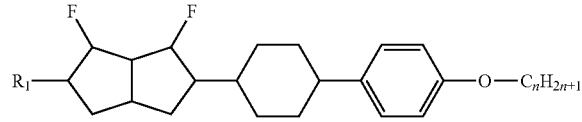

wherein $R_1$ is selected from hydrogen, fluorine, $CF_3$, $C_nH_{2n+1}$, or $C_nH_{2n+1}O$, and n is a natural number selected from 1 to 5.

4. The liquid crystal composition of claim 1, wherein the liquid crystal compound represented by Formula 1 comprises a liquid crystal compound represented by the following Formulae 1-6 to 1-10:

[Formula 1-6]

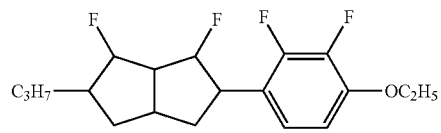

[Formula 1-7]

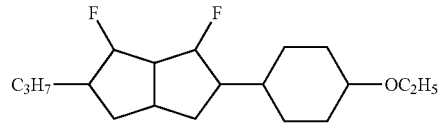

[Formula 1-8]

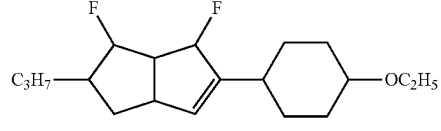

[Formula 1-9]

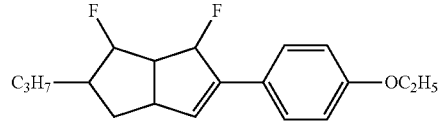

[Formula 1-10]

5. The liquid crystal composition of claim 1, further comprising
at least one liquid crystal compound selected from liquid crystal compounds represented by the following Formulae 2 to 10:

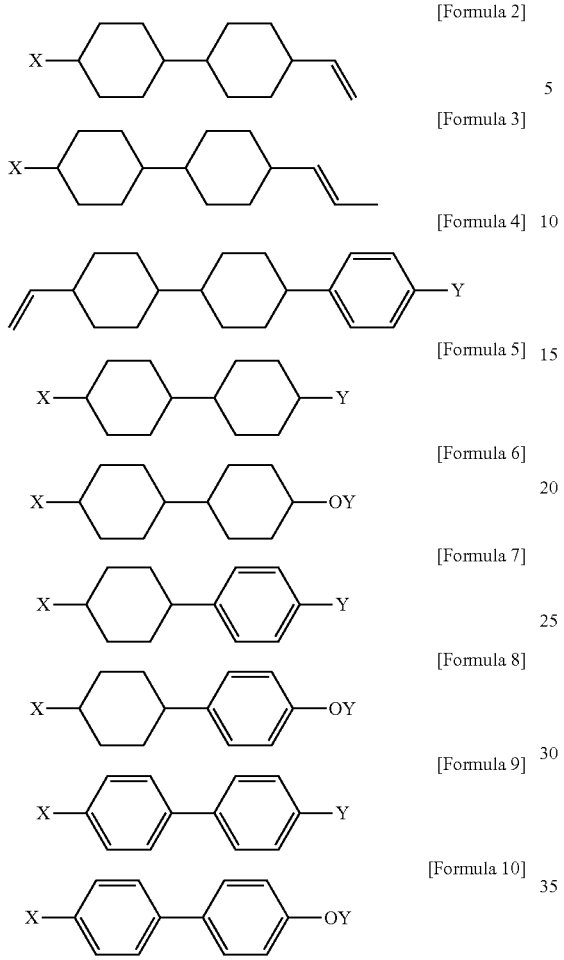

wherein X and Y are each independently $C_nH_{2n+1}$, and n is a natural number selected from 1 to 5.

6. The liquid crystal composition of claim 1, further comprising
at least one liquid crystal compound selected from liquid crystal compounds represented by the following Formulae 11 to 20:

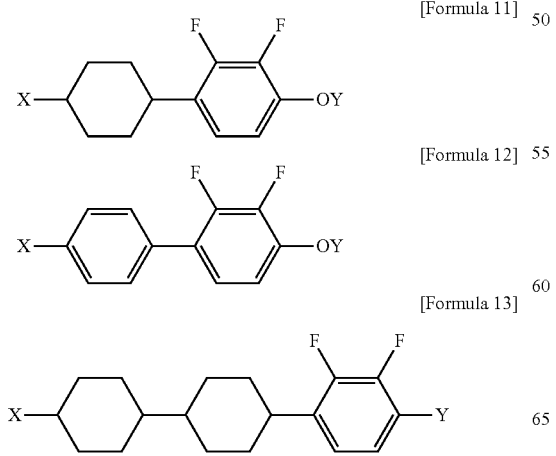

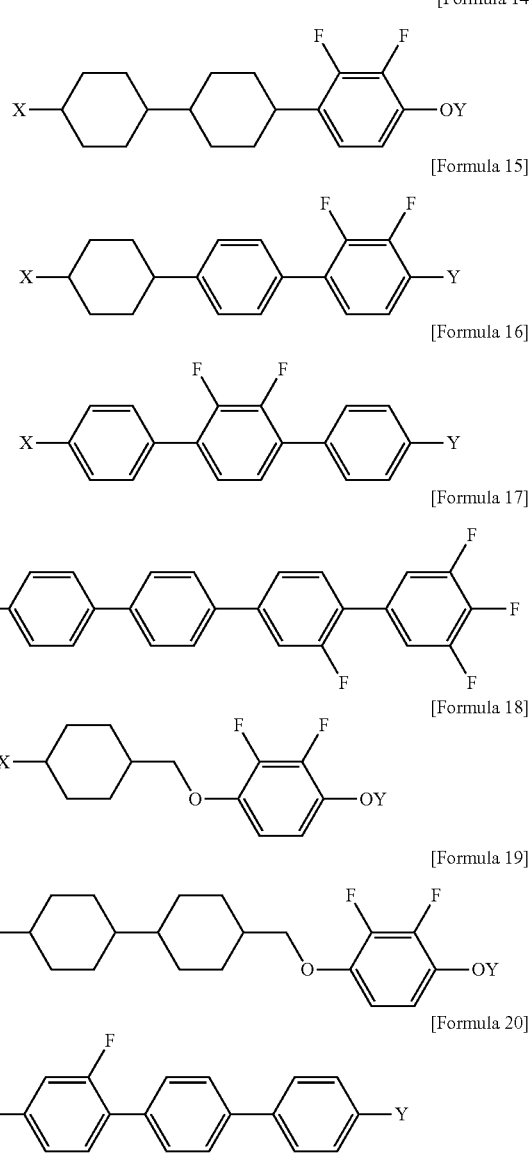

wherein X and Y are each independently $C_nH_{2n+1}$, and n is a natural number selected from 1 to 5.

7. The liquid crystal composition of claim 5, wherein
the liquid crystal compound represented by Formula 2 is in an amount ranging from about 10 wt % to about 30 wt % of the liquid crystal composition,
each of the liquid crystal compounds represented by Formulae 3, 6, and 7 is in an amount ranging from about 5 wt % to about 15 wt % of the liquid crystal composition,
the liquid crystal compound represented by Formula 4 is in an amount ranging from about 3 wt % to about 10 wt % of the liquid crystal composition,
the liquid crystal compound represented by Formula 5 is in an amount ranging from about 10 wt % to about 35 wt % of the liquid crystal composition, and
each of the liquid crystal compounds represented by Formulae 8, 9, and 10 are present in an amount ranging from about 3 wt % to about 25 wt % of the liquid crystal composition.

8. The liquid crystal composition of claim 6, wherein
each of the liquid crystal compounds represented by Formulae 11, 14, and 15 is in an amount ranging from about 5 wt % to about 25 wt % of the liquid crystal composition,
each of the liquid crystal compounds represented by Formulae 12 and 13 is in an amount ranging from about 5 wt % to about 20 wt % of the liquid crystal composition,
the liquid crystal compound represented by Formula 16 is in an amount ranging from about 1 wt % to about 15 wt % of the liquid crystal composition,
the liquid crystal compound represented by Formula 17 is in an amount ranging from about 0.03 wt % to about 5 wt % of the liquid crystal composition, and
each of the liquid crystal compounds represented by Formulae 18, 19, and 20 is in an amount ranging from about 5 wt % to about 20 wt % of the liquid crystal composition.

9. The liquid crystal composition of claim 1, wherein
a rotational viscosity of the liquid crystal composition is less than or equal to about 100 mPa·s.

10. A liquid crystal display, comprising:
a first substrate;
a second substrate positioned above and overlapping with the first substrate; and
a liquid crystal layer disposed between the first substrate and the second substrate,
wherein the liquid crystal layer comprises a liquid crystal compound represented by the following Formula 1:

[Formula 1]

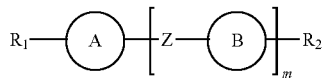

wherein,

is selected from

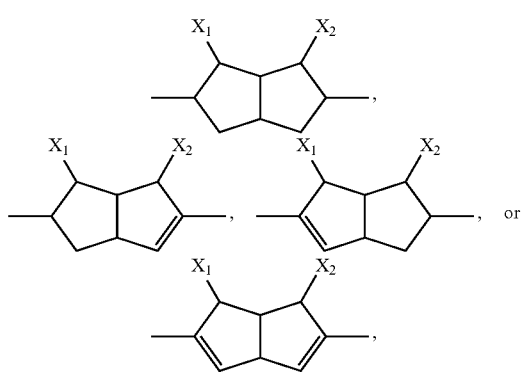

$X_1$ and $X_2$ are each independently selected from fluorine, $CF_3$, or $C_nH_{2n+1}$,
Z is selected from a single bond, a double bond, $CF_2CF_2$, $OCF_2$, or $CF_2O$,
$R_1$ is selected from hydrogen, fluorine, $CF_3$, $C_nH_{2n+1}$, or $C_nH_{2n+1}O$,
$R_2$ is selected from hydrogen, fluorine, $CF_3$, $C_nH_{2n+1}$, or $OC_nH_{2n+1}$,

is selected from

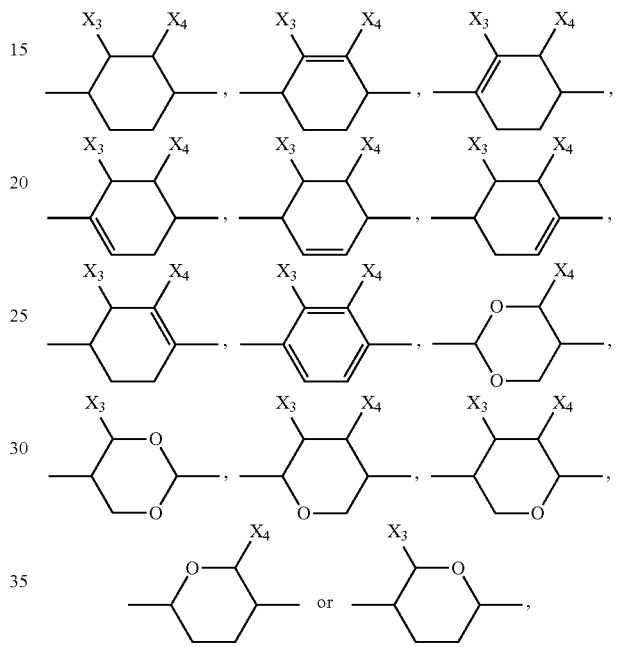

$X_3$ and $X_4$ are each independently selected from hydrogen, fluorine, $CF_3$, or $C_nH_{2n+1}$,
m is a natural number selected from 1 or 2, and
n is a natural number selected from 1 to 5.

11. The liquid crystal display of claim 10, wherein
the liquid crystal compound represented by Formula 1 is in an amount ranging from about 1 wt % to about 20 wt % of the liquid crystal layer.

12. The liquid crystal display of claim 10, wherein
the liquid crystal compound represented by Formula 1 comprises a liquid crystal compound represented by the following Formulae 1-1 to 1-5:

[Formula 1-1]

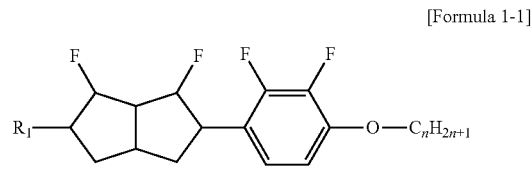

[Formula 1-2]

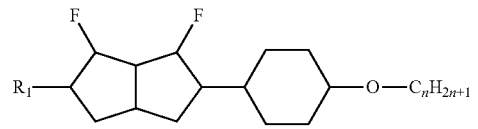

[Formula 1-3]
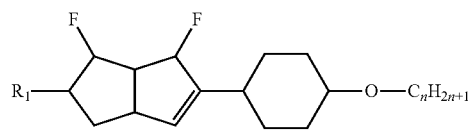

[Formula 1-4]
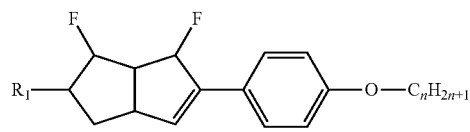

[Formula 1-5]
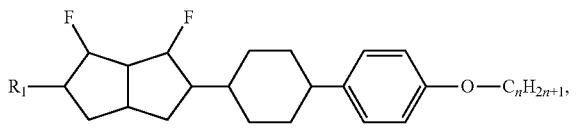

wherein $R_1$ is selected from hydrogen, fluorine, $CF_3$, $C_nH_{2n+1}$, or $C_nH_{2n+1}O$, and
n is a natural number selected from 1 to 5.

13. The liquid crystal display of claim 10, wherein
the liquid crystal compound represented by Formula 1 comprises a liquid crystal compound represented by the following Chemical Formulae 1-6 to 1-10:

[Formula 1-6]

[Formula 1-7]
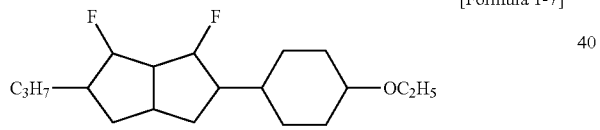

[Formula 1-8]
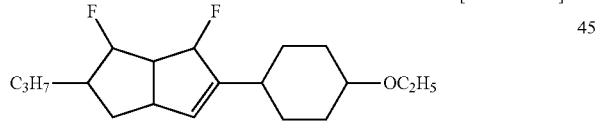

[Formula 1-9]
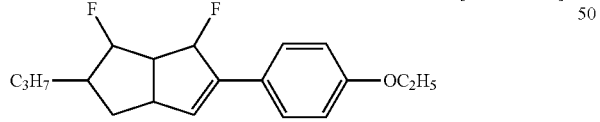

[Formula 1-10]
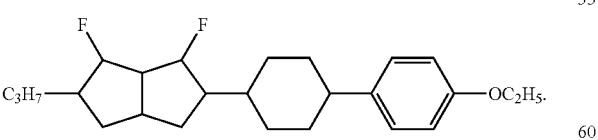

14. The liquid crystal display of claim 10, wherein
the liquid crystal layer further comprises at least one liquid crystal compound selected from liquid crystal compounds represented by the following Formulae 2 to 10:

[Formula 2]
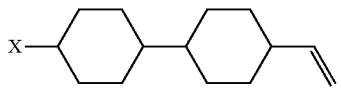

[Formula 3]
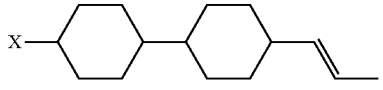

[Formula 4]
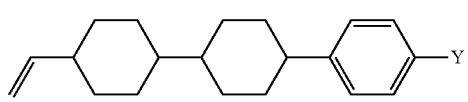

[Formula 5]
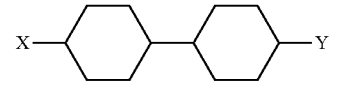

[Formula 6]
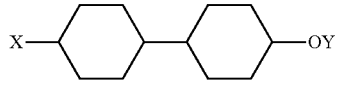

[Formula 7]
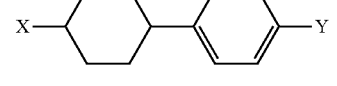

[Formula 8]
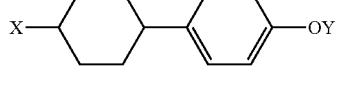

[Formula 9]
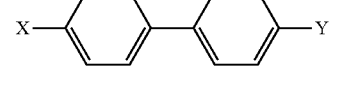

[Formula 10]
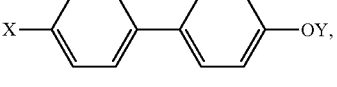

wherein X and Y are each independently $C_nH_{2n+1}$, and n is a natural number selected from 1 to 5.

15. The liquid crystal display of claim 10, wherein
the liquid crystal layer further comprises at least one liquid crystal compound selected from liquid crystal compounds represented by the following Formulae 11 to 20:

[Formula 11]
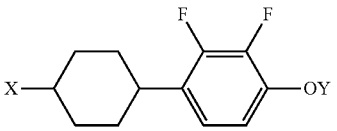

[Formula 12]
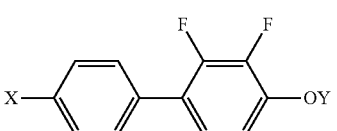

[Formula 13]
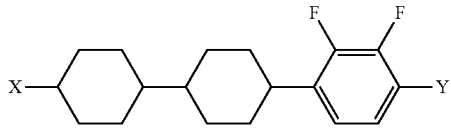

-continued

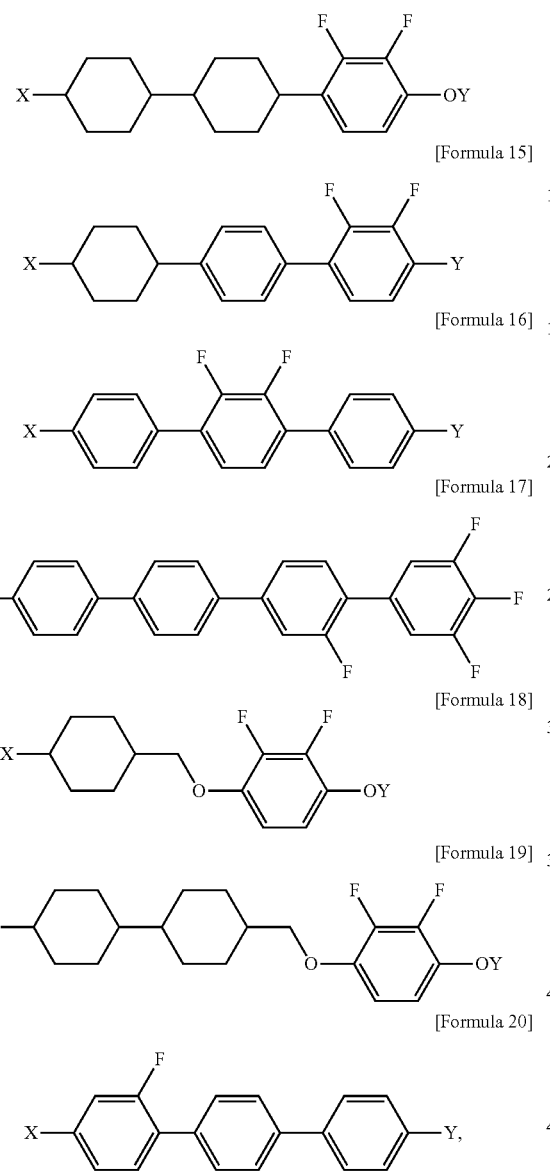

wherein X and Y are each independently $CH_nH_{2n+1}$ and n is a natural number selecte from 1 to 5.

16. The liquid crystal display of claim 14, wherein
the liquid crystal compound represented by Formula 2 is in an amount ranging from about 10 wt % to about 30 wt % of the liquid crystal layer,
each of the liquid crystal compounds represented by Formulae 3, 6, and 7 is in an amount ranging from about 5 wt % to about 15 wt % of the liquid crystal layer,
the liquid crystal compound represented by Chemical Formula 4 is 3 wt % to 10 wt % of the entire liquid crystal layer,
the liquid crystal compound represented by Formula 5 is in an amount ranging from about 10 wt % to about 35 wt % of the liquid crystal layer, and
each of the liquid crystal compounds represented by Formulae 8, 9, and 10 is in an amount ranging from about 3 wt % to about 25 wt % of the liquid crystal layer.

17. The liquid crystal display of claim 15, wherein
each of the liquid crystal compounds represented by Formulae 11, 14, and 15 is in an amount ranging from about 5 wt % to about 25 wt % of the liquid crystal layer,
each of the liquid crystal compounds represented by Formulae 12 and 13 is in an amount ranging from about 5 wt % to about 20 wt % of the liquid crystal layer,
the liquid crystal compound represented by Formula 16 is in an amount ranging from about 1 wt % to about 15 wt % of the liquid crystal layer,
the liquid crystal compound represented by Formula 17 is in an amount ranging from about 0.03 wt % to about 5 wt % of the liquid crystal layer, and
each of the liquid crystal compounds represented by Formulae 18, 19, and 20 is in an amount ranging from about 5 wt % to about 20 wt % of the liquid crystal layer.

18. The liquid crystal display of claim 10, wherein
a rotational viscosity of the liquid crystal composition is less than or equal to about 100 mPa·s.

19. The liquid crystal display of claim 10, further comprising:
a pixel electrode disposed on the first substrate; and
a common electrode disposed on the second substrate.

20. The liquid crystal display of claim 19, wherein the pixel electrode includes a first sub-pixel electrode and a second sub-pixel electrode.

* * * * *